Jan. 15, 1957  M. P. WINTHER  2,777,965
POWER TRANSMITTING MECHANISM
Filed Jan. 19, 1953

INVENTOR.
Martin P. Winther
BY
McDonald & Teagno
Attorneys

United States Patent Office 2,777,965
Patented Jan. 15, 1957

2,777,965

POWER TRANSMITTING MECHANISM

Martin P. Winther, Gates Mills, Ohio, assignor to Eaton Manufacturing Company, Cleveland, Ohio, a corporation of Ohio Application January 19, 1953, Serial No. 331,895

7 Claims. (Cl. 310—105)

This invention relates to power transmitting mechanism and more particularly to the cooling thereof.

It has been determined that the cooling of heat dissipating power transmitting mechanisms, and especially those associated with automotive vehicles and driven from the vehicle's engine, by open air circulation, present the problem of vulnerability in explosive atmosphere wherein the heat dissipated by the mechanisms is sufficient to ignite dust, lint or other foreign particles circulated by the air adjacent the heat dissipating surfaces of the mechanism.

Broadly the invention comprehends the cooling of engine driven heat dissipating power transmitting mechanisms, such as torque converters of the hydraulic type employed in automotive vehicles and electromagnetic clutches employed as the main drive clutch of automotive vehicles, by utilizing the filtered intake air for the engine, from which the mechanism is driven.

Among the principal objects of the invention is the provision of engine filtered intake air cooling of engine driven heat dissipating power transmitting mechanisms, that:

a. Provides for effective cooling of the mechanism;

b. Prevents the admission of dust, lint, or other foreign particles to be present in the cooling air coming in contact with or close proximity to the mechanism being cooled;

c. Includes a closed housing for the mechanism into which the filtered air passes in its passage from the outside atmosphere to the engine;

d. Includes a closed housing for the power transmitting mechanism, an air intake filter, flexible air conveying ducting between the filter and the housing and flexible ducting for conveying the air passing through the housing to the engine from which the mechanism is driven; and e. Includes an electromagnetic clutch as the power transmitting mechanism, driven from an engine, a housing for the clutch, said housing being arranged in air communication between an air intake filter, for the housing and engine, and the engine and fan means connected with the clutch which together with cooperative structure of the clutch and housing provides for a slight pressure build up in the housing adjacent the air outlet from the housing.

Figure 1:
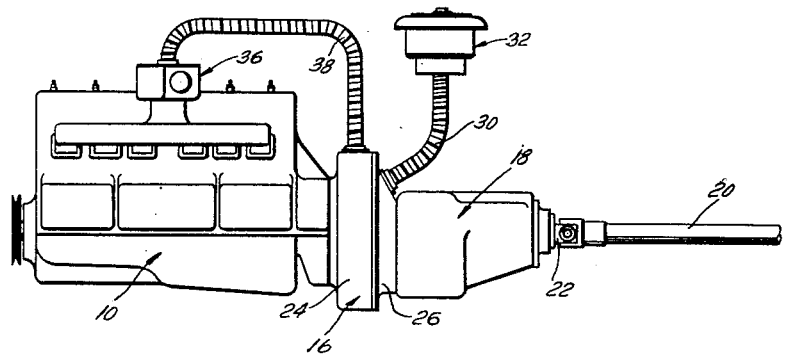
Figure 2:
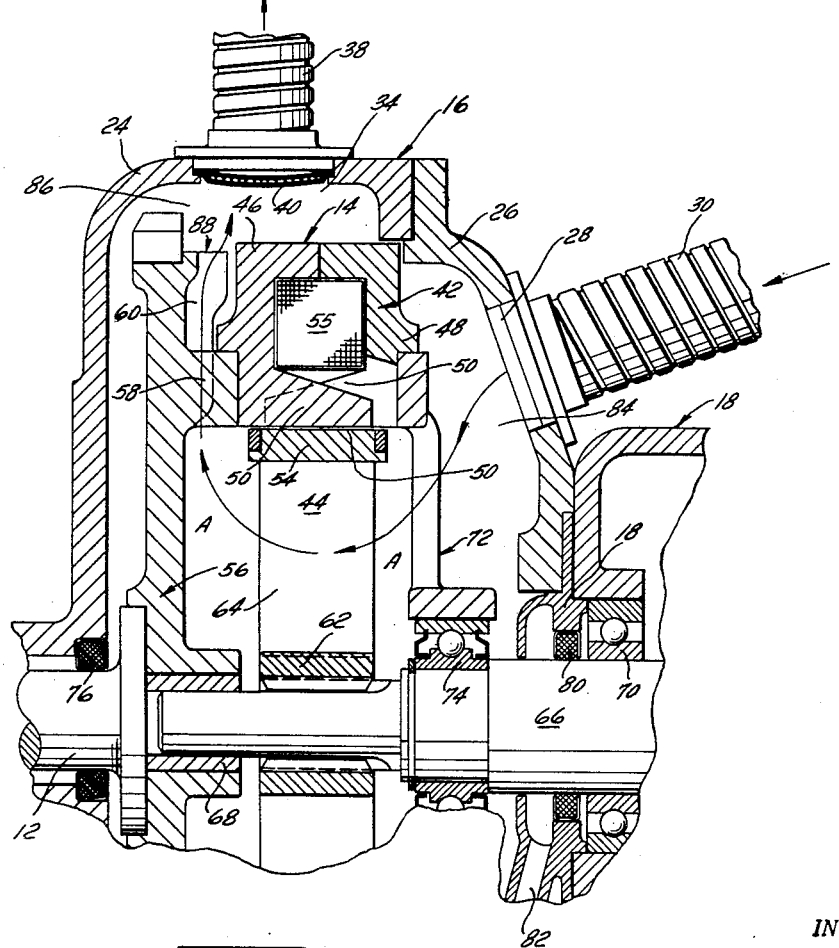

Other objects and advantages of the invention will appear from the following description taken in connection with the drawings forming a part of the specification, and in which:

Fig. 1 is an elevation view of a vehicle engine or power plant together with power output means driven therefrom embodying the invention; and Fig. 2 is a fragmentary enlarged cross-sectional view of an eddy current electromagnetic clutch forming a part of the structure of Fig. 1.

Referring to the drawings for more specific details of the invention 10 represents generally an internal combustion engine constituting the power plan of an automotive vehicle or the like, the power output end of crankshaft 12 of which is bolted or otherwise fixedly secured to an eddy current electromagnetic clutch 14.

As noted in Fig. 1, a housing 16 for clutch 14 is secured to the rear of engine 10 and a transmission housing 18 is in turn bolted to the opposite end of the clutch housing 16 from engine 10. A drive shaft 20 is coupled to an output shaft 22 of the transmission contained in housing 18. Drive shaft 20 is adapted to be associated with appropriate axle gearing for the drive wheels of a vehicle, not shown.

Clutch housing 16 includes front and rear annular portions 24 and 26, bolted or otherwise suitably secured together. An air inlet opening 28 is provided in housing portion 26 having air communication with the atmosphere by way of a flexible air conveying duct 30 connected at one end upon the housing portion 26 and at its opposite end to an air intake filter apparatus 32 of the conventional type employed in association with automotive vehicle engines. An air outlet opening 34 for housing 16 is provided in portion 24 thereof having air delivery communication with the carburetor 36 for engine 10 by way of flexible air conveying duct 38 connected at one end upon housing portion 24 and at its opposite end to the intake for carburetor 36. An anti-backfire screen 40 is fixedly arranged in outlet opening 34, the purpose of which will hereinafter appear. By so providing ducts 30 and 38 arranged as hereinbefore recited and as illustrated by Figs. 1 and 2 atmospheric air is required to pass through housing 16 in the course of its air flow path from the air intake filter apparatus 32 to the carburetor.

Eddy current clutch 14 is of generally conventional structure and includes an annular rotatable field member 42 and a cooperable rotor 44. Field member 42 includes a pair of juxtaposed annular magnetic members 46 and 48 having circumferentially spaced polar teeth 50 on their inner peripheral surface with the teeth of the members arranged in axially extended interdigitated relation to one another. The inner surfaces of polar teeth 50 lie in a common cylindrical surface radially spaced from a smooth cylindrical surface 52 of a magnetic ring 54 forming a part of rotor 44. An annular space provided between members 46 and 48 receives an electromagnetic coil 55 which is energizable from a source of electric current, not shown.

Field member 42 is coupled to crankshaft 12 by way of a flywheel 56 having an inner peripheral portion thereof secured to the crankshaft and a plurality of circumferentially spaced axially extended struts 58 or the like connected to member 46 and providing therewith radial air passages circumferentially intermediate the struts 58 and fan blade elements 60 formed on the flywheel, the purpose of which will hereinafter appear.

Rotor 44 includes in addition to ring 54, a hub 62 connected to ring 54 by a plurality of circumferentially spaced spokes or fins 64 extending substantially radially therebetween. Hub 62 is splined to an output shaft 66, which shaft in turn is telescopically supported at its free end in a sleeve bearing 68 fitted internally of a portion of the hub of flywheel 56 and journalled at a position axially spaced from the splined relation with the rotor upon a bearing 70 mounted in an end hub of housing 18.

Field member 42 in addition to being coupled to flywheel 56 has an end support member 72 secured to member 48 thereof, which support member is in turn journalled upon a bearing 74 mounted on shaft 66. Support member 72 extends generally radially and provides a webbed construction permitting of the passage of air axially therethrough.

An oil seal 76 is arranged between the hub of portion 24 of housing 16 and the crankshaft near its connection with the flywheel and a circular confined chamber member 78 is secured between the housings 16 and 18 having close running clearance with shaft 66 and supporting an oil seal 80 axially inwardly of bearing 70. A large hole 82 is provided in member 78 for ready access to atmospheric pressure, so as to serve to eliminate pulling oil from the transmission housing as a result of vacuum created by the carburetor.

In viewing the upper part of Fig. 2 it is to be noted that the member 48 of field member 42 is constructed so as to have limited operating clearance with the junction of portions 24 and 26 of housing 16 whereby an air intake chamber 84 is provided in housing 16 adjacent air intake opening 28 and an air discharge chamber 86 is provided adjacent air outlet opening 34. With chambers 84 and 86 so separated air drawn through the air intake filter apparatus 32 is made to follow the path designated by arrows A wherein air passes into chamber 84 through the webbed section of member 72, between the spokes 64 of rotor 44, by way of the radial passages between the flywheel and member 46 and through discharge chamber 86 to the engine by way of duct 38.

Filter apparatus 32 is so constructed preferably as to have a low resistance to air flow and thus is large in size. As such, vacuum is prevented from being created in the clutch housing which would tend to cause flow of lubricating oil into the clutch from the rear crankshaft bearing. The provision of member 78 at the forward end of transmission housing 18 is adequate to prevent the flow of oil from the transmission housing due to slight atmospheric depression adjacent this location in housing 16.

In so utilizing an eddy current clutch 14 it is necessary to provide for the delivery of a large volume of air so as to adequately cool the rotor 44. Fan blades 60 as arranged on flywheel 56 provide a fan 88 which upon rotation of rotor 44 serves to draw air into the housing 16 by way of filter apparatus 32. Fan 88 serves to build up a slight pressure in chamber 86 and that portion of the housing adjacent the end of the crankshaft, at high speed open thrust operation of the engine, such as to prevent leakage at the crankshaft and to provide for a slight supercharging of the engine which in effect compensates, at least partly, for the lower volumetric efficiency obtained from increase in temperature of the air used for cooling the rotor.

Anti-backfire screen 40 serves to prevent any backfiring into the clutch chamber which might tend to set off an explosion therein.

Although the heat dissipating power transmitting mechanism illustrated is specific in being in the form of an eddy current clutch as driven from an engine, it is readily conceivable that the basic premise of the invention resides in the cooling of any heat dissipating power transmitting mechanism through the utilization of clean filtered air which is being drawn into the engine for the operation thereof and that accordingly the appended claims are couched in such language as to lend protection to the fundamental inventive concepts taught hereby.

What I claim is:

1. Mechanism adapted for use with an internal combustion engine, in air intake flow relation therewith, comprising an electromagnetic clutch to be air-cooled, driven from an output member of the engine, a housing enclosing the clutch having air intake and discharge openings therein, said clutch including relatively rotatable input and output members, one of said clutch members having axial air passages therethrough providing for the cooling thereof, and said other clutch member having radial flow passages therethrough and air-impelling means arranged thereon axially disposed to one side of the air passages through said one clutch member, said intake opening being axially disposed to one side of the axial passages, and said discharge opening being radially adjacent the outlet of the fan means, and one of said clutch members having close running clearance with the housing intermediate the air intake and discharge openings in the housing to so provide separate chambers, one adjacent the air intake opening in the housing and the other adjacent the air discharge opening in the housing with the air passages and air-impelling means in consecutive order intermediate the chamber adjacent the air intake opening and the chamber adjacent the air discharge opening.

2. Mechanism according to claim 1 wherein an anti-backfire screen is arranged in the air discharge opening in the housing.

3. Mechanism according to claim 1 wherein the air passages are provided in the output member and the air impelling means are provided on the clutch input.

4. Mechanism according to claim 3 wherein the output member of the engine is a shaft extending axially through one end of the mechanism housing, wherein a shaft is connected to the input member of the clutch extending axially through the other end of housing, sealing means provided between the opposite axial ends of the housing and the respective shafts, and an atmospheric pressure fed circular chambered member axially inwardly disposed of the sealing means on the shaft connected to the housing of the clutch in close running clearance relation to the output member connected shaft.

5. Mechanism according to claim 4 wherein the air impelling means is in the form of a radial air moving fan with its inlet adjacent one axial end of the output member of the clutch and with its outlet adjacent the chamber which is adjacent the air discharge opening in the housing.

6. Mechanism including a housing having an air intake opening in one end wall thereof and a discharge opening in a cylindrical portion thereof, and a magnetic clutch disposed internally of the housing including an input member and an output member, one of said members having a plurality of axial passages therethrough and said other member including an end plate disposed to one side of the axial passages in said one member opposite axially disposed from the inlet side of said axial passages and a main body portion disposed concentrically radially outwardly disposed about said other member and said passages therethrough, said end plate and body portion providing a plurality of radially extended passages providing communication between the discharge end of the axial passages in said one member and said discharge opening in the housing, said end plate forming a radially extended air baffle at the junction between the axial passages and radially extended passages.

7. Mechanism according to claim 6 wherein said main body portion and said housing are in close sealing spaced relation intermediate said inlet and discharge openings.

References Cited in the file of this patent

UNITED STATES PATENTS

| | | |
|---|---|---|
| 1,769,281 | Zubaty | July 1, 1930 |
| 2,205,629 | Peterson | June 25, 1940 |
| 2,409,557 | Gilfillan | Oct. 15, 1946 |
| 2,479,989 | Winther | Aug. 23, 1949 |
| 2,541,227 | Findley | Feb. 13, 1951 |
| 2,676,280 | Jaeschke | Apr. 20, 1954 |